United States Patent [19]

Shibata et al.

[11] Patent Number: 5,325,215
[45] Date of Patent: Jun. 28, 1994

[54] MATRIX MULTIPLIER AND PICTURE TRANSFORMING CODER USING THE SAME

[75] Inventors: Koichi Shibata, Hachiouji; Masaaki Takizawa, Suginami, both of Japan

[73] Assignee: Hitachi, Ltd., Tokyo, Japan

[21] Appl. No.: 810,173

[22] Filed: Dec. 19, 1991

[30] Foreign Application Priority Data

Dec. 26, 1990 [JP] Japan .................................. 2-406984

[51] Int. Cl.$^5$ ............................................. H04N 1/40
[52] U.S. Cl. ..................................... 358/479; 358/433; 358/471; 358/426; 382/56
[58] Field of Search ............... 358/426, 427, 261.1, 358/261.2, 261.3, 432, 433, 448, 460, 465, 471, 479; 382/56; 341/50; 364/725, 726, 754, 736

[56] References Cited

U.S. PATENT DOCUMENTS

| | | | |
|---|---|---|---|
| 4,774,587 | 9/1988 | Schmitt ................................. | 358/426 |
| 4,922,273 | 5/1990 | Yonekawa et al. .................... | 382/56 |
| 5,170,264 | 12/1992 | Saito et al. ........................... | 358/426 |
| 5,187,755 | 2/1993 | Aragaki ................................ | 382/56 |

Primary Examiner—Edward L. Coles, Sr.
Assistant Examiner—Jerome Grant, III
Attorney, Agent, or Firm—Antonelli, Terry, Stout & Kraus

[57] ABSTRACT

A matrix multiplier used in a picture transforming coder is provided for multiplying an input signal matrix by a coefficient matrix configured to comprise as many constant multipliers as absolute values of coefficients in the transform coefficient matrix for handling the signal matrix as common multiplicands, a plurality of selectors for selecting values necessary for computing elements of the matrix product from multiplication results output by the constant multipliers and a respective accumulator assigned to each of the selectors for accumulating the selected values to finally provide an element of the matrix product. As a result, since the processing can be done by merely performing as many fixed multiplications as absolute values of the coefficients in the transform coefficient matrix, the multipliers can be implemented as a relatively simple combination of adders, allowing the entire size of a picture information transforming coder or the like to be reduced.

6 Claims, 7 Drawing Sheets

MATRIX MULTIPLIER AND PICTURE TRANSFORMING CODER USING THE SAME

BACKGROUND OF THE INVENTION (1) Field of the Invention

The present invention relates to a matrix multiplier and a picture transforming coder using the matrix multiplier. In particular, the present invention is applicable to a coder and decoder for audio signals and standstill as well as moving picture information and relates to a matrix multiplier utilized in a transforming/coding unit for matrix multiplication of a coefficient matrix used in the coder by a signal matrix and a picture transforming coder utilizing the matrix multiplier.

(2) Description of the Prior Art

In many cases, a technique referred to hereafter as DCT (Discrete Cosine Transform) is used in an apparatus for efficiently coding a picture signal or the like. DCT is a kind of frequency transformation which is similar to Fourier transformation. For example, let input picture information be treated as a block of pixels comprising 8 horizontal rows and 8 vertical columns. Such a block of pixels is represented by a matrix [x] each element of which corresponds to a pixel. DCT results, or what is called DCT coefficients, are represented by a matrix [X]. Using transform coefficients [C] and its transposed matrix t[c], the relations between the matrices [x] and [X] are given by Equation (1). In many cases, DCT and inverse DCT processings are carried out in accordance with the matrix relations given by Equation 1.

Equation (1):

$$\text{DCT } [X] = [C] \times [] \times [^T C]$$

$$\text{Inverse DCT } [] = {}^T[C] \times [X] \times [C]$$

where t[ ] denotes a transposed matrix and the matrix [C] is expressed by the following equation:

$$[C] = \begin{pmatrix} C_{0\cdot0} & C_{0\cdot1} & C_{0\cdot2} & C_{0\cdot3} & C_{0\cdot4} & C_{0\cdot5} & C_{0\cdot6} & C_{0\cdot7} \\ C_{1\cdot0} & C_{1\cdot1} & C_{1\cdot2} & C_{1\cdot3} & C_{1\cdot4} & C_{1\cdot5} & C_{1\cdot6} & C_{1\cdot7} \\ C_{2\cdot0} & C_{2\cdot1} & C_{2\cdot2} & C_{2\cdot3} & C_{2\cdot4} & C_{2\cdot5} & C_{2\cdot6} & C_{2\cdot7} \\ C_{3\cdot0} & C_{3\cdot1} & C_{3\cdot2} & C_{3\cdot3} & C_{3\cdot4} & C_{3\cdot5} & C_{3\cdot6} & C_{3\cdot7} \\ C_{4\cdot0} & C_{4\cdot1} & C_{4\cdot2} & C_{4\cdot3} & C_{4\cdot4} & C_{4\cdot5} & C_{4\cdot6} & C_{4\cdot7} \\ C_{5\cdot0} & C_{5\cdot1} & C_{5\cdot2} & C_{5\cdot3} & C_{5\cdot4} & C_{5\cdot5} & C_{5\cdot6} & C_{5\cdot7} \\ C_{6\cdot0} & C_{6\cdot1} & C_{6\cdot2} & C_{6\cdot3} & C_{6\cdot4} & C_{6\cdot5} & C_{6\cdot6} & C_{6\cdot7} \\ C_{7\cdot0} & C_{7\cdot1} & C_{7\cdot2} & C_{7\cdot3} & C_{7\cdot4} & C_{7\cdot5} & C_{7\cdot6} & C_{7\cdot7} \end{pmatrix}$$

where $$C_{ij} = \frac{1}{2} k(i) \times \cos\left(\frac{(2j+1)i\pi}{16}\right)$$

$$k(i) = 1/\sqrt{2} \text{ for } i = 0$$

$$k(i) = 1 \text{ for } i = 1, \ldots, 7$$

Figure 1:
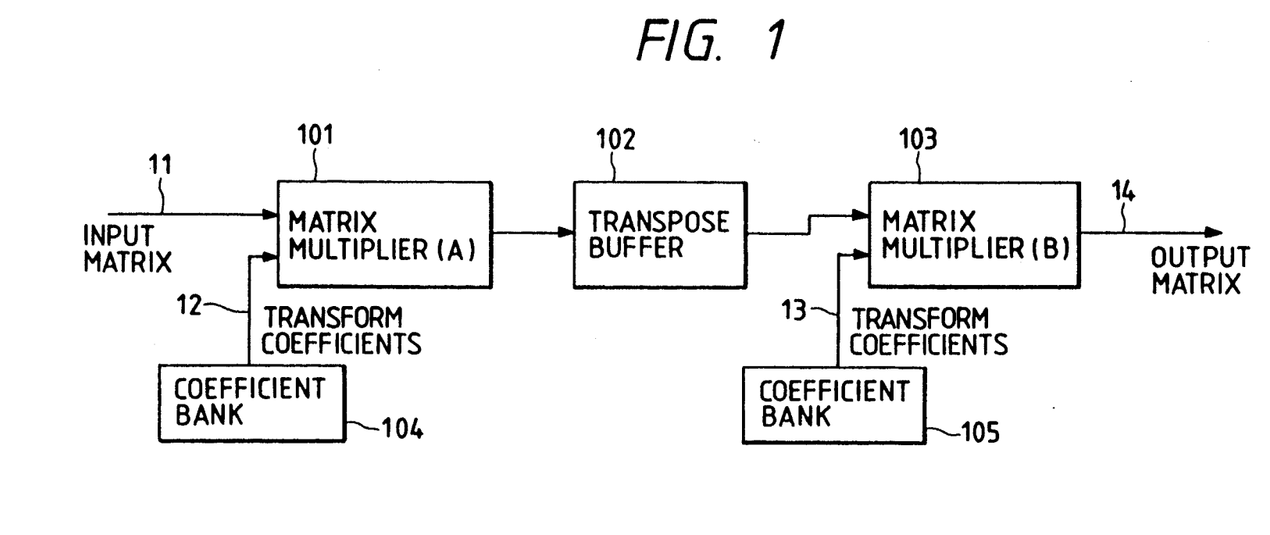
FIG. 1 is a diagram showing a general configuration of a DCT processing apparatus.

FIG. 1 shows a general configuration of a DCT processing apparatus for executing DCT and inverse DCT manipulations. In the case of the DCT processing, the picture information matrix [x] is used as an input matrix 11. As for the inverse DCT processing, it is the DCT coefficient matrix [X] which is used as the input matrix 11. The input matrix 11 is multiplied by transform coefficients 12 stored in a coefficient bank 104 by means of a matrix multiplier (A) denoted by reference numeral 101. The results of the matrix multiplication are stored temporarily in a transpose buffer 102. The results stored in the transpose buffer 102 are further multiplied by transform coefficients 13 stored in a coefficient bank 105 by means of a matrix multiplier (B) denoted by reference numeral 103. The results of the matrix multiplication are obtained as an output matrix 14. In this case, the coefficient matrices 12 and 13 are the transform coefficients [C] and its transposed matrix t[C] respectively.

Figure 2:
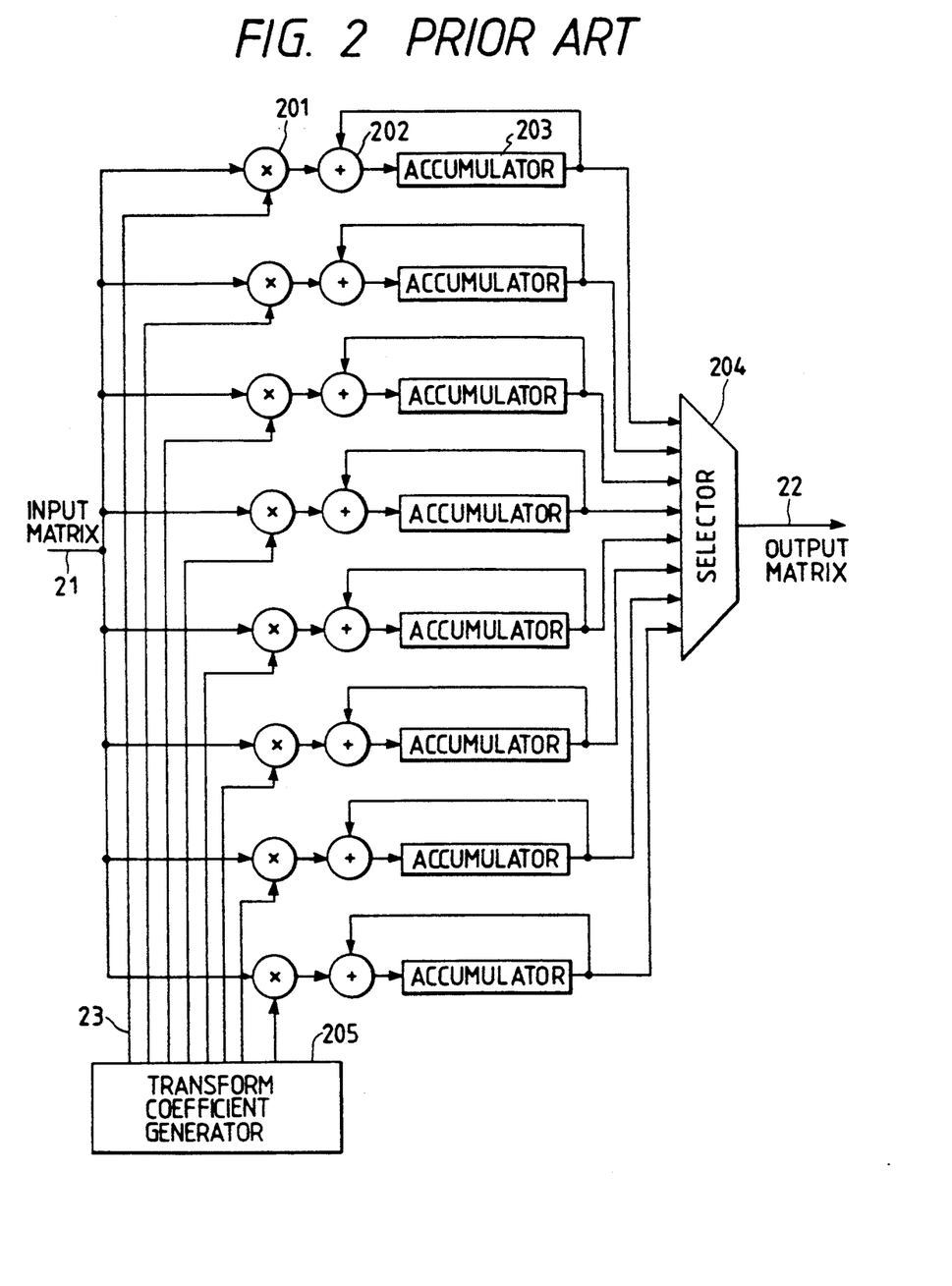
FIG. 2 is a diagram showing the configuration of the conventional matrix multiplier.

FIG. 2 shows a typical configuration of the conventional matrix multiplier for performing the DCT and inverse DCT manipulations. In other words, FIG. 2 shows the configuration of the matrix multiplier (A) or (B) denoted by reference numeral 101 or 103 in FIG. 1. Each multiplier 201 is used for multiplying an element on a row (or column) of an input matrix 21 by an element on a column (or row) of a transform coefficient matrix 23 coming from a transform coefficient generator 205. The result of the multiplication is stored in an accumulator 203 through an adder 202. The multiplication is repeated for all elements on each row (column) of the input matrix 21 and for all elements on each column (row) of the transform coefficient matrix 23 and the result of each multiplication is added to the contents of the accumulator 203. As all the elements are multiplied, the accumulators 203 are selected one after another by a selector 204 in order to output their contents sequentially as an output matrix 22.

Figure 3:
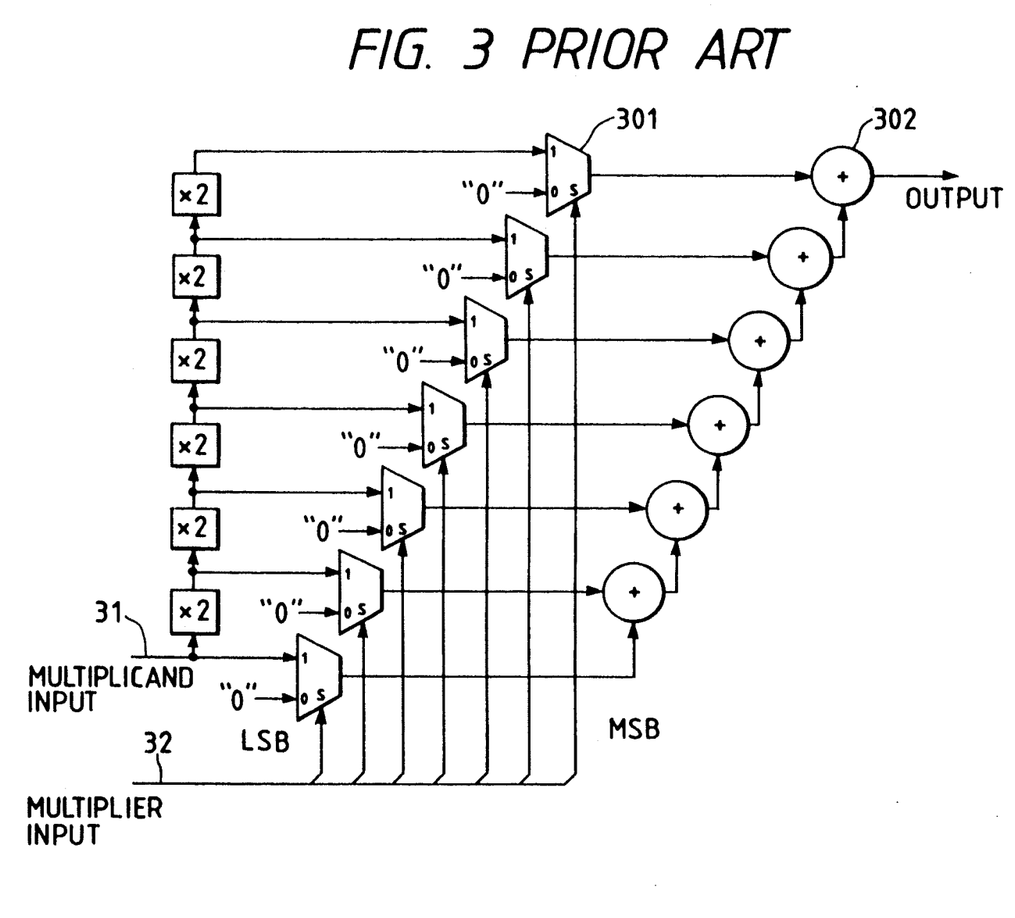
FIG. 3 is a diagram showing the configuration of the conventional multiplier.

A typical configuration of the multiplier 201 is shown in FIG. 3. For the Ith bit of a multiplier 32, a multiplicand 31 is arithmetic-left-shifted I times, where I=0 to n. Note that arithmetic-left-shifting the multiplicand 31 I times is equivalent to multiplying the multiplicand 31 by the Ith power of 2. If the Ith bit of the multiplier 32 is a '1' then the arithmetic-left-shifted result is selected by a selector 301 and added to an output by an adder 302. If the Ith bit of the multiplier 32 is a '0' however the arithmetic-left-shifted result is not selected by the selector 301 and, thus, not added to the output by tile adder 302.

SUMMARY OF THE INVENTION

In the configuration of the matrix multiplier shown in FIG. 1, as many multipliers 201 as rows (or columns) of the transform coefficients are required. In addition, the transform coefficients which are used as multipliers in the multipliers 201 may vary from row to row (or column to column) of elements of the input matrix. Accordingly, a circuit having a large scale is required, in which case operations must be carried out at a high speed. In general, it is difficult to implement a multiplier with a small physical sized hardware. For example, in order to multiply an N-digit multiplicand by an M-digit multiplier using the typical multiplier shown in FIG. 3, it is necessary to provide N ×M units of 1-bit full adders. Let us take a video telephone conforming to the international standards as an example. In order to perform real-time processing within the same time frame as the input signal with a sufficient accuracy, 8 units of matrix multipliers are required for simultaneously multiplying an input signal matrix comprising 8 rows and 8 columns of elements with each element being a 16-bit binary number by a transform coefficient matrix comprising 8 rows and 8 columns of elements with each element being a 14-bit binary number. If the processing is to be done by the matrix multiplier shown in FIG. 2, 1,792 (16×14×8) units of adders are required. In order to carry out both the DCT and inverse DCT processings, the number of required adders is equal to this count further multiplied by 4.

It is therefore an object of the present invention to provide a matrix multiplier for multiplying an input signal matrix by a transform coefficient matrix with a multiplying unit thereof implemented using a reduced number of circuit elements.

It is another object of the present invention to provide a low-cost picture coder used in video telephones and the like for performing DCT transformations.

In order to achieve the above objects, a multiplying unit for multiplying an input signal matrix by a transform coefficient matrix is configured in accordance with the present invention to comprise:

as many coefficient multiplying means as different absolute values of coefficients in said transform coefficient matrix for multiplying said transform coefficients by input signal values with said input signal matrix used as common multiplicands for said coefficient multiplying means;

a plurality of selectors for selecting values required for computing elements of a matrix product among multiplication results output by said coefficient multiplying means; and an accumulating means associated with each of said selectors for accumulating multiplication results to be output as an element of said matrix product.

In addition, the coefficient multiplying means are binary multipliers configured to share common processing means. The coefficient multiplying means are used to simultaneously multiply a signal value by 2 or more transform coefficients. Every common processing means described above is used for processing each bit pattern in the binary codes common to the transform coefficients.

Effective embodiments according to the present invention include a coder for processing picture information and the like using the DCT transformation. Nonetheless, applications of the present invention are not limited to such a coder.

The matrix multiplier according to the present invention employs as many multipliers as different absolute values of elements Ci, j of a transform coefficient matrix [C]. In addition, the transform coefficients which are used as multipliers do not vary during a period of inputting a row (or column) of a multiplicand matrix. Let a matrix given by Equation (2) below be the transform coefficient matrix [C] having elements Ci, j actually used for the transformation. In Equation 2, the absolute values of the elements Ci, j are represented by C1 to C7. As such, the number of element values including negative ones is 14. Accordingly, only 7 multipliers are required for multiplying the seven coefficients, C1 to C7, by an input signal value. Multiplication results required for computing elements of a matrix product are selected by the selectors and then accumulated in the accumulating means.

Equation (2)
$$[C] = \begin{pmatrix} C4 & C4 & C4 & C4 & C4 & C4 & C4 & C4 \\ C1 & C3 & C5 & C7 & -C7 & -C5 & -C3 & -C1 \\ C2 & C6 & -C6 & -C2 & -C2 & -C6 & C6 & C2 \\ C3 & -C7 & -C1 & -C5 & C5 & C1 & C7 & -C3 \\ C4 & -C4 & -C4 & C4 & C4 & -C4 & -C4 & C4 \\ C5 & -C1 & C7 & C3 & -C3 & -C7 & C1 & -C5 \\ C6 & -C2 & C2 & -C6 & -C6 & C2 & -C2 & C6 \\ C7 & -C3 & C3 & -C1 & C1 & -C3 & C5 & -C7 \end{pmatrix}$$

where $$C1 = \frac{1}{2} \cos\left(\frac{\pi}{16}\right),$$

$$C2 = \frac{1}{2} \cos\left(\frac{2\pi}{16}\right),$$

$$C3 = \frac{1}{2} \cos\left(\frac{3\pi}{16}\right),$$

$$C4 = \frac{1}{2} \cos\left(\frac{4\pi}{16}\right),$$

$$C5 = \frac{1}{2} \cos\left(\frac{5\pi}{16}\right),$$

$$C6 = \frac{1}{2} \cos\left(\frac{6\pi}{16}\right),$$

$$C7 = \frac{1}{2} \cos\left(\frac{7\pi}{16}\right)$$

Accordingly, for few coefficient absolute values of the transform coefficient matrix [C], the number of multipliers can be reduced, thus resulting in an apparatus with a small size.

In addition, the multipliers are configured to share common processing means for manipulating common bit patterns in the binary codes of the transform coefficients.

Each of the multipliers is used to multiply an input signal by a transform coefficient which does not vary. Accordingly, each multiplier can be implemented as a relatively simple combination of adders. By providing in advance a shared processing means for each bit pattern in the binary codes common to transform coefficients, the amount of processing can be further reduced. In order to obtain results of the matrix multiplication, only necessary outputs of the multipliers are sequentially selected and then accumulated.

The foregoing and other objects, advantages of operation and novel features of the present invention will be understood from the following detailed description when read in connection with the accompanying drawings.

DESCRIPTION OF THE PREFERRED EMBODIMENTS

Referring to diagrams, embodiments according to the present invention are described as follows.

Figure 4:
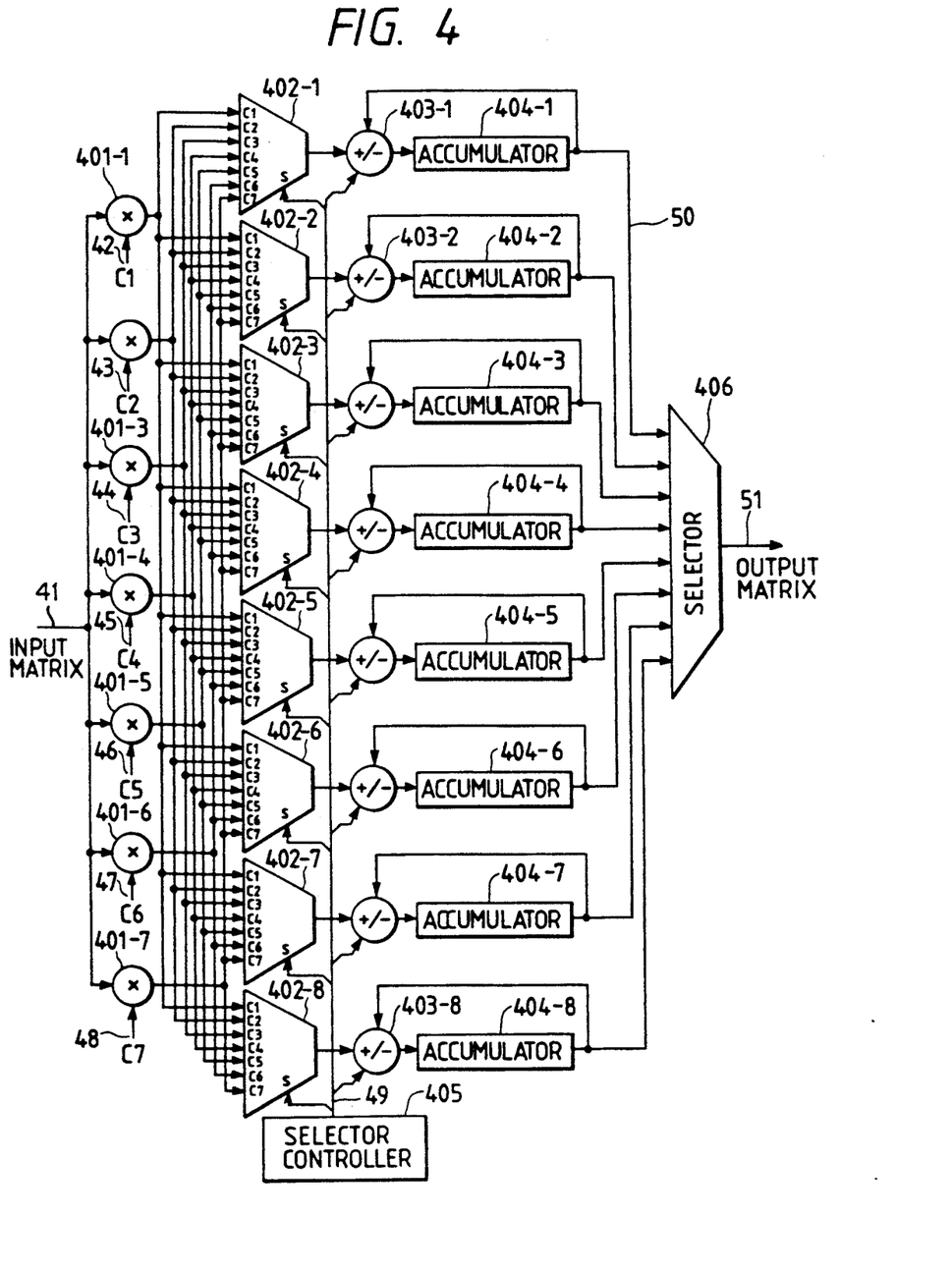
FIG. 4 is a diagram showing the configuration of an embodiment implementing a matrix multiplier in accordance with the present invention.

FIG. 4 is a diagram showing the configuration of an embodiment implementing a matrix multiplier in accordance with the present invention. The embodiment is configured to implement a circuit for executing the DCT code transformation on picture information comprising $8 \times 8$ pixels. The pixels each correspond to an element of a matrix. The elements of the matrix to be multiplied simultaneously are supplied as matrix multiplicand inputs 41 which are fed to a plurality of multipliers 401-1 to 401-7. The elements are each multiplied by transform coefficients 42 to 48 having seven different values represented by C1 to C7 in Equation (2). Only values required for computing the matrix product are selected from results obtained from the multipliers 401-1 to 401-7 by selectors 402-1 to 402-8 in accordance with the matrix product equation for the matrix of Equation (2). Note that each of the selectors 402-1 to 402-8 is associated with an element of the matrix product. The order in which the values are selected by one of the selectors 402-1 to 402-8 is determined by a select control line 49 which is programmed by a selector controller 405. It should be noted that for the sake of diagrammatical simplicity, the select control line 49 is denoted by a single line in the figure. In the actual configuration, however, each of the selectors 402-1 to 402-8 is provided with one independent select control line.

A selected value is then added to or subtracted from contents 50 of an accumulator 404 by an adder/subtractor 403. The selection as to whether an addition or subtraction is to be carried out depends upon whether the value of the transform coefficient multiplied is positive or negative.

As the matrix multiplication for an input matrix is completed, the accumulators 404 each contain an element of the matrix product. The elements of the matrix product are sequentially fetched by a selector 406 and transmitted as a matrix processing output 51. The selector 406 has the same configuration as the conventional selector shown in FIG. 2 which the reader is already familiar with. In actuality, each of the accumulators 404-1 to 404-8 is provided with a register for storing an element of the matrix product. At the completion of the matrix multiplication, the contents of each register are reset to zero. The contents of each register are output as an output matrix 81 at fixed timing. In the mean time, the multipliers 401-i, the selectors 402-j and the accumulators 404-j, where i=1 to 7 and j=1 to 8, are used to carry out the matrix multiplication for the next input multiplicand matrix in the same way as the preceding matrix multiplication.

Figure 5:
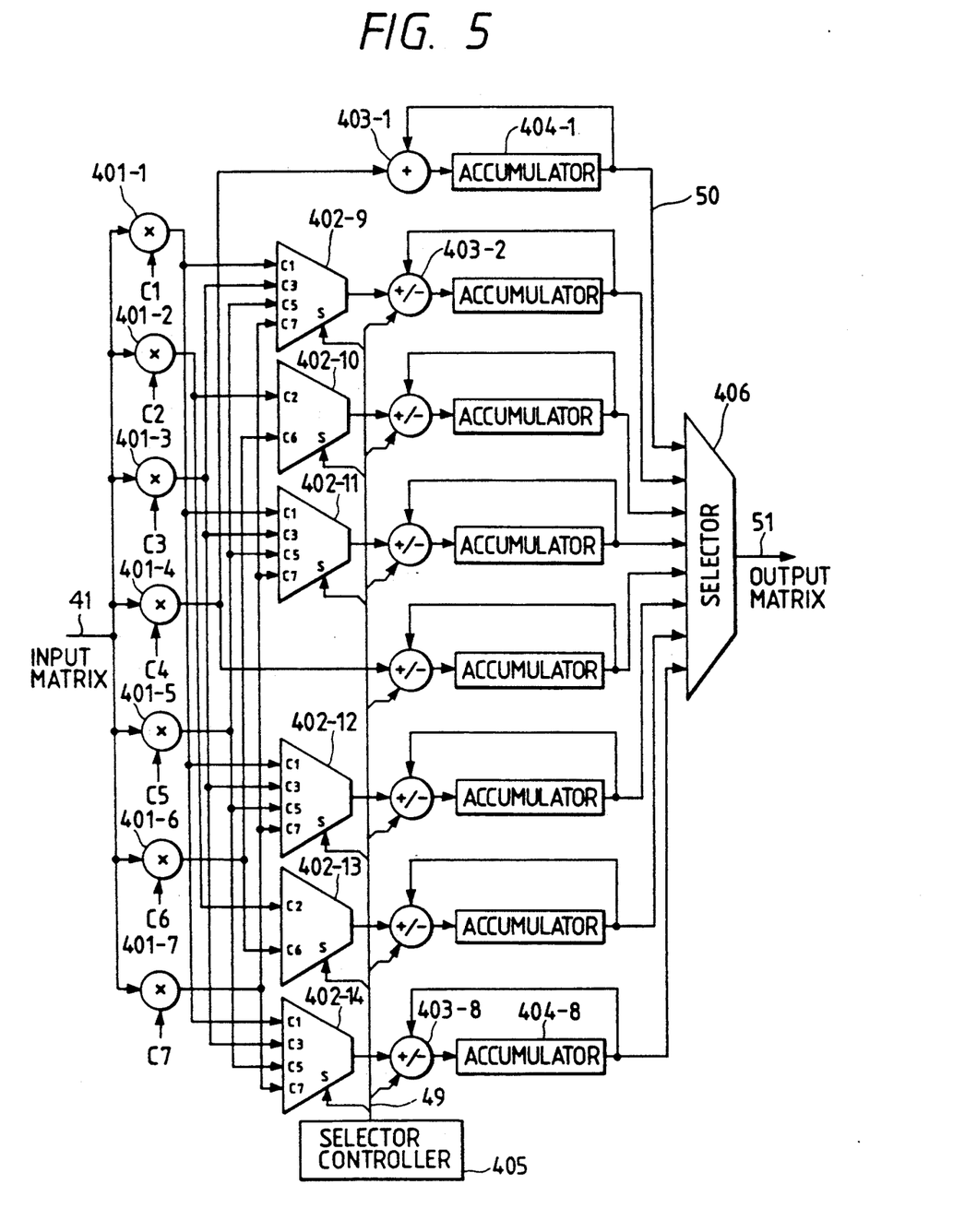
FIG. 5 is a diagram showing tile configuration of another embodiment implementing a matrix multiplier in accordance with the present invention.

FIG. 5 is a diagram showing the configuration of another embodiment implementing a matrix multiplier in accordance with the present invention. In the latter matrix multiplication of the DCT transformation and the former matrix multiplication of the inverse DCT transformation, the number of coefficients used in the matrix multiplications is even smaller. The fact that the coefficient count is lower allows the configuration of the selectors 402 in the embodiment to be further simplified. To be more specific, in addition to a reduced number of selectors 402, each of the selectors 402 can also be made much simpler. The matrix expressed by Equation (2) clearly indicates that the selectors 402-1 and 402-5 always select products of multiplying the transform coefficient C4. Accordingly, the selectors 402-1 and 402-5 and their select control lines 49 are not required. As for the selectors other than the 402-1 and the 402-5, their number of inputs to be selected is reduced to 4 or 2, resulting in a simplified circuit of the selector controller 405 and simplified select control lines 49.

Figure 6:
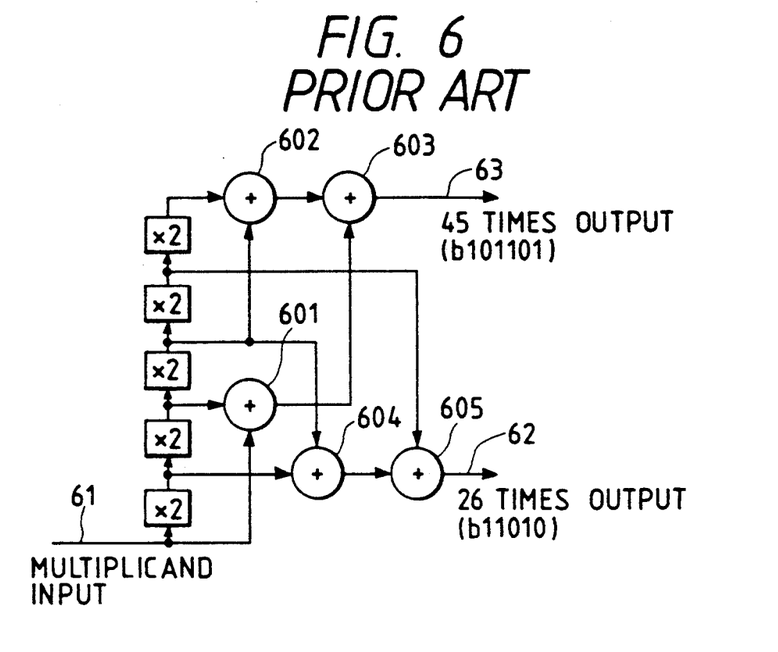
FIG. 6 is a diagram showing the configuration of the conventional coefficient multipliers.
Figure 7:
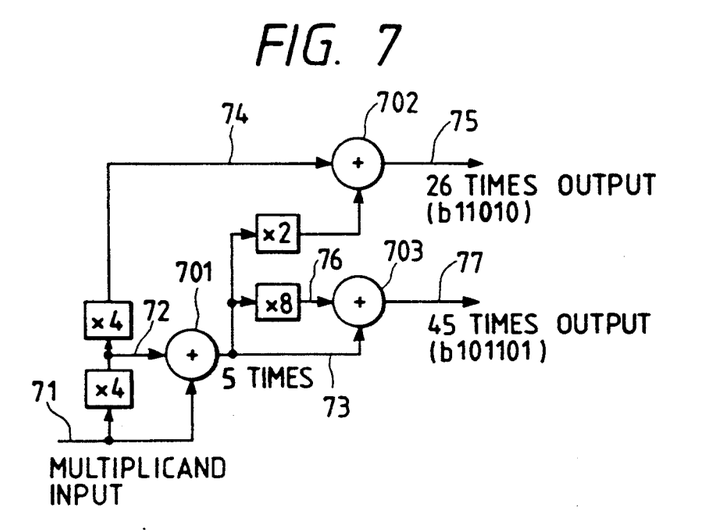
FIG. 7 is a diagram showing the operational configuration of an embodiment implementing coefficient multipliers in accordance with the present invention.

FIG. 7 is a diagram showing the operational configuration of the coefficient multipliers 401 used in the matrix multiplier in accordance with the present invention. A multiplier for multiplying coefficients is implemented as a combination of adders such as the conventional one shown in FIG. 6. As shown in FIG. 6, a procedure for computing a 26 times output 62 and a 45 times output 63 of a multiplicand input 61 is given as follows. The binary format of the number 26 is known to be '11010' which is the sum of the 16 times, the 8 times and the 2 times. Accordingly, the 26 times output can be obtained by adding the 16 times, the 8 times and the 2 times with adders 604 and 605. Similarly, the binary format of the number 45 is known to be '101101' which is the sum of the 32 times, the 8 times, the 4 times and the 1 time. Accordingly, the 45 times output can be obtained by adding the 32 times, the 8 times, the 4 times and the 1 time with adders 601, 602 and 603. In this case, since multiplying a number by the nth power of 2 is equivalent to arithmetic-left-shifting the number, no special processing is required. Accordingly, five units of adders are used as is shown in the figure.

On the other hand, with a technique provided by the present invention, a common bit pattern in the binary codes of the coefficients is identified and assigned to a common processing means to be shared by the multipliers. For example, the binary format of the number 26 is '11010' whereas that of the number 45 is '101101' as described above. A bit pattern '101' is common to both the binary codes '11010' and '101101'. Accordingly, when computing 26 times and 45 times outputs at the same time, the 5 times calculation corresponding to the common bit pattern '101' can be carried out by a common processing means provided in advance and to be shared by the multipliers. The 26 times output is then computed by adding the product of the 5 times and the 2 times to the 16 times while the 45 times output is calculated by adding the product of the 5 times and the 8 times to the 5 times. In this way, the processing can be simplified. To be more specific, a 4 times value 72 of a multiplicand input 71 is added to the multiplicand input 71 by an adder 701 to result in a 5 times value 73 which is multiplied by 2 and then added to a 16 times value 74 of the multiplicand input 71 by using an adder 702 to give the 26 times output 75. At the same time, the 5 times value 73 is multiplied by 8 to result in a 40 times value 76 which is added to the 5 times value 73 to give the 45 times output 77. In the embodiment shown in FIG. 7, the number of adders is thereby reduced to three.

It is obvious that the technique adopted in the above embodiment is not limited to the computation of the 26 and 45 times but can also be applied to all cases as well. In addition, any common bit pattern can always be assigned to a shared processing means as in the case with the common bit pattern '101'.

Figure 8:
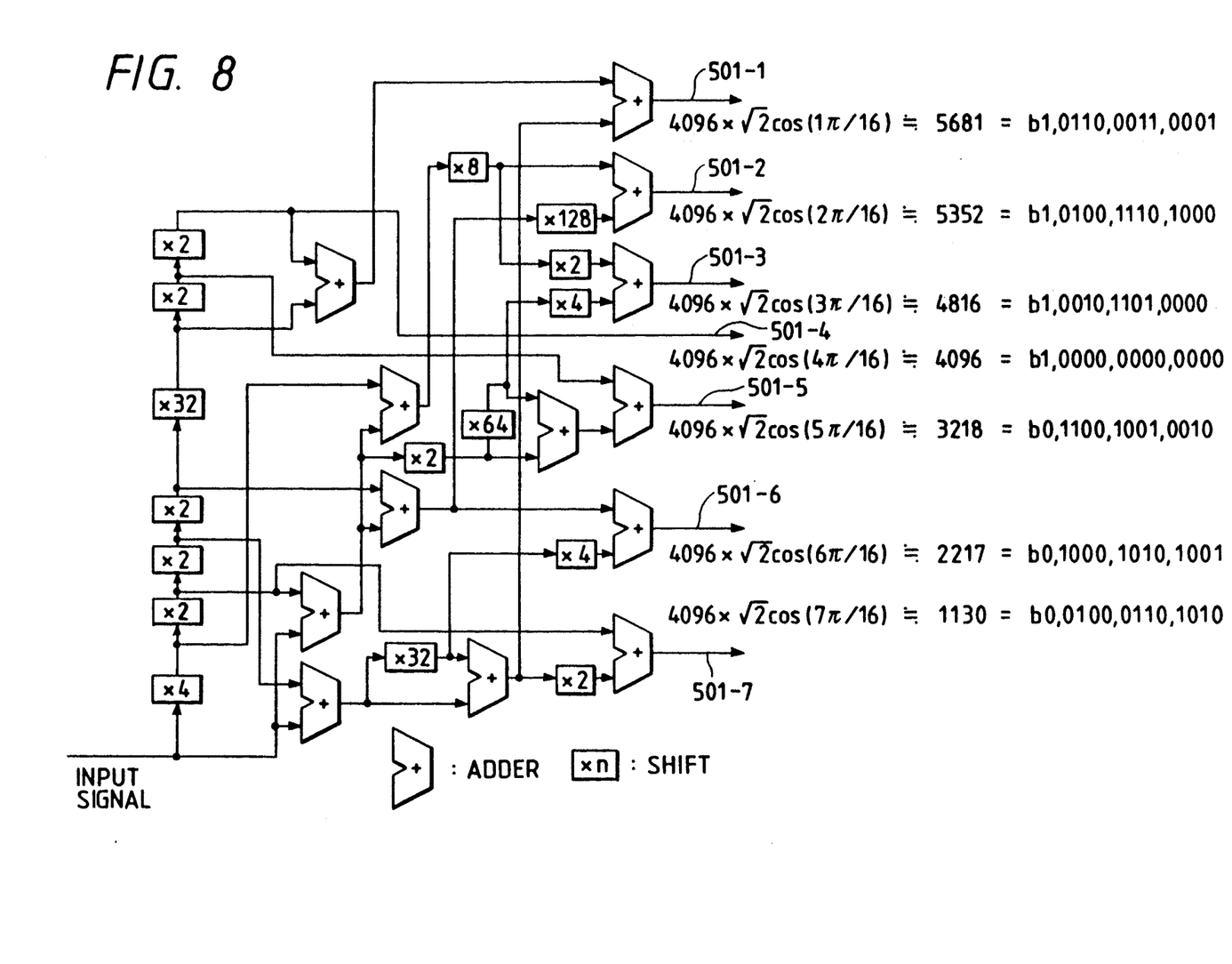
FIG. 8 is a diagram showing an actual circuit configuration of the multipliers 401-1 to 401-7 employed in the matrix multiplier for manipulating the DCT processing shown in FIG. 4 or 5.

FIG. 8 is a diagram showing an actual circuit configuration of the multipliers 401-1 to 401-7 employed in the matrix multiplier for manipulating the DCT processing shown in FIG. 4 or 5. In this case, it is assumed that in the configuration shown in FIG. 8, coefficients to be multiplied by input data are alpha$\times$C1 to alpha$\times$C7, where alpha=4,096$\times$2$\sqrt{2}$. Accordingly, if the value of alpha changes, the number of times the arithmetic-left-shift operation to be performed also varies. Outputs of adders 501-1 to 501-7 shown in FIG. 8 correspond to the outputs of the multipliers 401-1 to 401-7 shown in FIG. 4 or 5. With the configuration of the multipliers shown in FIG. 8, the number of adders can be reduced to only 13. Therefore, in order to give a 16-bit processing accuracy, only 178 (=13$\times$16) units of adders are needed. When compared to the 1,792 units of adders required in the multipliers adopting the conventional technique, the number 178 clearly means that the DCT transformation can be carried out to achieve the same processing accuracy using only one tenth as much of the conventional hardware.

The above embodiments are described mainly for applications for manipulating 8$\times$8 elements. It should be noted, however, that applications of the present invention are not limited to the processing of 8$\times$8 elements. The present invention is particularly effective when applied to a code transforming apparatus for handling picture information even though it is not restricted to such an application.

In the matrix multiplier provided by the present invention, the multipliers for outputting elements of a matrix product have a configuration in which coefficients are treated as multiplier inputs. In addition, the number of multipliers is independent of the number of elements in a row or column of the input multiplicand matrix and determined only by the number of absolute values of the coefficients in the transform coefficient matrix. Accordingly, the number of multipliers can be reduced. As a result, the invention allows a matrix multiplier having a small size and a low cost to be implemented. In particular, the effects of the present invention on the implementation and popularization of a transforming coder for picture information are substantial since the reduction in apparatus size and cost is a very important requirement.

We claim:

1. A picture transforming coder for efficiently coding a picture signal comprising:
   a first matrix multiplier for performing matrix processing on an input signal and a first transform coefficient matrix; and
   a second matrix multiplier for performing matrix processing on outputs of said first matrix multiplier and a second transform coefficient matrix which is the transposed matrix of said first transform coefficient matrix, said second matrix multiplier outputting matrix processing results as a coded picture signal;
   wherein said first matrix multiplier includes:
   a plurality of constant multiplying means for receiving said input signal in predetermined block units, handling each of said block units as a multiplicand matrix and multiplying each element of said multiplicand matrix by each element of said first transform coefficient matrix,
   a plurality of selectors for selecting necessary output values from multiplication results output by said constant multiplying means,
   a control means for controlling said selectors by following predetermined rules established in accordance with said first transform coefficient matrix, and
   a plurality of accumulating means for storing elements of the matrix product by accumulating said necessary output values with each of said accumulating means assigned to one of said selectors.

2. A picture transforming coder according to claim 1, wherein said input signal received in said block units is two-dimensional information on a plurality of pixels adjacent to each other;
   said first transform coefficient matrix is a DCT coefficient matrix; and
   said second transform coefficient matrix is the transposed matrix of said DCT coefficient matrix.

3. A picture transforming coder according to claim 1, wherein said constant multiplying means is configured to include a common numerical processing means shared by a first numerical processing means for multiplying a first coefficient of said first transform coefficient matrix by a matrix element of said multiplicand matrix, a second numerical processing means for multiplying a second coefficient of said first transform coefficient matrix by said matrix element and any other numerical processing means for multiplying other coefficients of said first transform coefficient matrix by said matrix element so that said constant multiplying means are capable of multiplying two or more coefficients of said first transform coefficient matrix by an element of said multiplicand matrix; and
   said common numerical processing means is used for handling a bit pattern common to the binary codes of said first coefficient, said second coefficient and said other coefficients being multiplied.

4. A matrix multiplier applicable to an apparatus for performing predetermined coded on an input signal comprising:
   a plurality of constant multiplying means, connected to receive said input signal in predetermined block units, for each handling a respective one of said block units as a multiplicand matrix and for multiplying each element of said multiplicand matrix by a respective of a coefficient matrix;
   a plurality of selectors each for selecting necessary output values from multiplication results output by said plurality of constant multiplying means;
   control means for controlling said selectors by following predetermined rules established in accordance with said coefficient matrix; and
   a plurality of accumulating means each storing elements of a matrix product by accumulating respective ones of said necessary output values received from a respective one of said selectors.

5. A matrix multiplier according to claim 4, wherein said input signal received in said block units is two-dimensional information on a plurality of pixels adjacent to each other; and said coefficient matrix is a DCT coefficient matrix of the transposed matrix of said DCT coefficient matrix.

6. A matrix multiplier applicable to an apparatus for performing predetermined coding on an input signal comprising:

a plurality of constant multiplying means for receiving said input signal in predetermined block units, handling each of said block units as a multiplicand matrix and multiplying each element of said multiplicand matrix by each of a coefficient matrix;

a plurality of selectors for selecting necessary output values from multiplication results output by said constant multiplying means, a control means for controlling said selectors by following predetermined rules established in accordance with said coefficient matrix; and a plurality of accumulating means for storing elements of the matrix product by accumulating said necessary output values with each of said accumulating means assigned to one of said selectors;

wherein said constant multiplying means is configured to include a common numerical processing means shared by a first numerical processing means for multiplying a first coefficient of said coefficient matrix by a matrix element of said multiplicand matrix, a second numerical processing means for multiplying a second coefficient of said coefficient matrix by said matrix element and any other numerical processing means for multiplying other coefficients of said coefficient matrix by said matrix element so that said constant multiplying means are capable of multiplying two or more coefficients of said coefficient matrix by an element of said multiplicand matrix; and wherein said common numerical processing means is used for handling a bit pattern common to the binary codes of said first coefficient, said second coefficient and said other coefficients being multiplied.

* * * * *